United States Patent
Hamada

(10) Patent No.: US 11,218,501 B2
(45) Date of Patent: Jan. 4, 2022

(54) DETECTOR, DETECTION METHOD, AND DETECTION PROGRAM

(71) Applicants: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

(72) Inventor: Yoshihiro Hamada, Osaka (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 38 days.

(21) Appl. No.: 16/634,605

(22) PCT Filed: Apr. 11, 2018

(86) PCT No.: PCT/JP2018/015211
§ 371 (c)(1),
(2) Date: Jan. 28, 2020

(87) PCT Pub. No.: WO2019/026352
PCT Pub. Date: Feb. 7, 2019

(65) Prior Publication Data
US 2021/0105292 A1    Apr. 8, 2021

(30) Foreign Application Priority Data
Aug. 3, 2017 (JP) .............................. JP2017-150771

(51) Int. Cl.
*H04L 29/06* (2006.01)
*H04L 29/08* (2006.01)

(52) U.S. Cl.
CPC .......... *H04L 63/1425* (2013.01); *H04L 67/12* (2013.01)

(58) Field of Classification Search
CPC ..... H04L 63/1425; H04L 67/12; H04L 12/40; H04L 63/14; H04L 2209/84
See application file for complete search history.

(56) References Cited

U.S. PATENT DOCUMENTS

2015/0066239 A1    3/2015  Mabuchi
2015/0191135 A1*   7/2015  Ben Noon .......... H04L 63/1408
                                                            726/22
(Continued)

FOREIGN PATENT DOCUMENTS

JP      2013-131907 A    7/2013
JP      2015-136107 A    7/2015
(Continued)

OTHER PUBLICATIONS

Renesas Electronics Corporation, "CAN Nyuumonsho (CAN Instroductory Guide (provisional translation)) Rev. 1.00", [online], [serached on Jun. 17, 2017], Internet <URL:https://www.renesas.com/ja-jp/doc/products/mpumcu/apn/003/rjj05b0937_canap.pdf>.
(Continued)

*Primary Examiner* — Backhean Tiv
*Assistant Examiner* — Linh T. Nguyen
(74) *Attorney, Agent, or Firm* — Oliff PLC

(57) ABSTRACT

This detection device detects an attack in an on-vehicle network that includes a bus in which a frame including identification information that allows recognition of at least one of a transmission source and a destination is transmitted. In the bus, a plurality of the frames including pieces of the identification information different from each other are transmitted. The detection device includes: a monitoring unit configured to monitor a communication error in the bus;
(Continued)

an aggregation unit configured to aggregate a communication error occurrence state regarding each piece of the identification information on the basis of a monitoring result by the monitoring unit; and a detection unit configured to detect the attack on the basis of an aggregation result by the aggregation unit.

6 Claims, 12 Drawing Sheets

(56) References Cited

U.S. PATENT DOCUMENTS

| | | | |
|---|---|---|---|
| 2015/0191136 A1 | 7/2015 | Ben Noon et al. | |
| 2015/0191151 A1 | 7/2015 | Ben Noon et al. | |
| 2015/0195297 A1 | 7/2015 | Ben Noon et al. | |
| 2016/0173505 A1 | 6/2016 | Ichihara | |
| 2016/0359893 A1* | 12/2016 | Kishikawa | H04L 67/12 |
| 2017/0013006 A1 | 1/2017 | Ujiie et al. | |
| 2017/0156081 A1* | 6/2017 | Sakai | H04L 1/0061 |
| 2018/0115575 A1* | 4/2018 | Hartkopp | H04L 63/1425 |
| 2018/0196941 A1* | 7/2018 | Ruvio | H04L 63/0227 |
| 2019/0007427 A1* | 1/2019 | Yajima | H04L 63/108 |
| 2019/0263423 A1* | 8/2019 | Wakabayashi | B60W 30/095 |
| 2020/0186560 A1* | 6/2020 | Ben-Noon | H04L 63/1425 |

FOREIGN PATENT DOCUMENTS

| | | |
|---|---|---|
| JP | 2016-097879 A | 5/2016 |
| JP | 2016-116075 A | 6/2016 |
| WO | 2015/151418 A1 | 10/2015 |

OTHER PUBLICATIONS

Cho et al. "Error Handling of In-vehicle Networks Makes Them Vulnerable." CCS, 2016, Proceedings of the 2016 ACM SIGSAC Conference on Computer and Communications Security, pp. 1044-1055.
Kameoka et al. "Bus-Off Attack against CAN ECU using Stuff Error injection from Raspberry Pi." 2017, Symposium on Cryptography and Information Security, 1E2-2.
Nakayama et al. "Impact of Real-Time Electrical Data Forgery on In-Vehicle CAN Bus." 2017, Symposium on Cryptography and Information Security, 1E2-3.
Jun. 12, 2018 International Search Report issued in International Patent Application No. PCT/JP2018/015211.

* cited by examiner

FIG. 9

| NUMBER OF TIMES OF OCCURRENCE OF PROTOCOL ERROR | CAN-ID | ST1 | ST2 | ST3 | ST4 | ST5 | LT |
|---|---|---|---|---|---|---|---|
| | 1 | 5 TIMES | 10 TIMES | 5 TIMES | 10 TIMES | 20 TIMES | 50 TIMES |
| | 2 | 5 TIMES | 5 TIMES | 0 TIMES | 0 TIMES | 0 TIMES | 10 TIMES |
| | ...... | ...... | ...... | ...... | ...... | ...... | ...... |
| | N | 0 TIMES | 0 TIMES | 0 TIMES | 0 TIMES | 0 TIMES | 0 TIMES |

Tbl1

FIG. 10

| INTRA-BUS PROTOCOL_ERROR DISTRIBUTION | ST1 | ST2 | ST3 | ST4 | ST5 | LT |
|---|---|---|---|---|---|---|
| | 2 | 2 | 1 | 1 | 1 | AVERAGE |
| | | | | | | 1.4 |

Tbl2

DETECTOR, DETECTION METHOD, AND DETECTION PROGRAM

TECHNICAL FIELD

The present invention relates to a detection device, a detection method, and a detection program.

This application claims priority on Japanese Patent Application No. 2017-150771 filed on Aug. 3, 2017, the entire content of which is incorporated herein by reference.

BACKGROUND ART

PATENT LITERATURE 1 (Japanese Laid-Open Patent Publication No. 2016-116075) discloses the following on-vehicle communication system. That is, the on-vehicle communication system is an on-vehicle communication system that performs message authentication by use of: a transmitter code that is a message authentication code generated by a transmitter of communication data; and a receiver code that is a message authentication code generated by a receiver of the communication data, the on-vehicle communication system comprising: a first ECU connected to an on-vehicle network and having only a first encryption key among the first encryption key and a second encryption key different from the first encryption key; a second ECU connected to the on-vehicle network and having at least the first encryption key; and a third ECU connected to the on-vehicle network and an external network and having only the second encryption key among the first encryption key and the second encryption key, the third ECU being configured to generate the transmitter code or the receiver code by use of the second encryption key when communicating over the on-vehicle network, wherein the second ECU transmits communication data to which the transmitter code generated by use of the first encryption key is assigned, and the first ECU verifies, when receiving a communication data, the transmitter code assigned to the received communication data by using the receiver code generated by use of the first encryption key.

CITATION LIST

Patent Literature

PATENT LITERATURE 1: Japanese Laid-Open Patent Publication No. 2016-116075
PATENT LITERATURE 2: Japanese Laid-Open Patent Publication No. 2016-97879
PATENT LITERATURE 3: Japanese Laid-Open Patent Publication No. 2015-136107

Non Patent Literature

NON PATENT LITERATURE 1: Renesas Electronics Corporation, "CAN Nyuumonsho (CAN Introductory Guide (provisional translation)) Rev. 1.00", [online], [searched on Jun. 17, 2017], Internet <URL:https://www.renesas.com/ja-jp/doc/products/mpumcu/apn/003/rjj05b0937_canap.pdf>
NON PATENT LITERATURE 2: K. Cho, and one other, [Error Handling of In-vehicle Networks Makes Them Vulnerable], CCS '16 Proceedings of the 2016 ACM SIGSAC Conference on Computer and Communications Security, P. 1044-1055
NON PATENT LITERATURE 3: Ryota Kameoka, and five others, "Bus-off attack against CAN ECU using Stuff Error injection from Raspberry Pi", 2017 Symposium on Cryptography and Information Security, 1E2-2
NON PATENT LITERATURE 4: Yoshifumi Nakayama, and three others, "Shasai CAN basu niokeru denkiteki deeta kaizan no kouka (Effect of electrical data falsification in on-vehicle CAN bus (provisional translation))", 2017 Symposium on Cryptography and Information Security, 1E2-3

SUMMARY OF INVENTION (1) A detection device of the present disclosure is configured to detect an attack in an on-vehicle network that includes a bus in which a frame including identification information that allows recognition of at least one of a transmission source and a destination is transmitted. In the bus, a plurality of the frames including pieces of the identification information different from each other are transmitted. The detection device includes: a monitoring unit configured to monitor a communication error in the bus; an aggregation unit configured to aggregate a communication error occurrence state regarding each piece of the identification information can the basis of a monitoring result by the monitoring unit; and a detection unit configured to detect the attack on the basis of an aggregation result by the aggregation unit.

(6) A detection method of the present disclosure is to be used in a detection device configured to detect an attack in an on-vehicle network that includes a bus in which a frame including identification information that allows recognition of at least one of a transmission source and a destination is transmitted. In the bus, a plurality of the frames including pieces of the identification information different from each other are transmitted. The detection method includes the steps of: monitoring a communication error in the bus; aggregating a communication error occurrence state regarding each piece of the identification information on the basis of a monitoring result; and detecting the attack on the basis of an aggregation result.

(7) A detection program of the present disclosure is to be used in a detection device configured to detect an attack in an on-vehicle network that includes a bus in which a frame including identification information that allows recognition of at least one of a transmission source and a destination is transmitted. In the bus, a plurality of the frames including pieces of the identification information different from each other are transmitted. The detection program is configured to cause a computer to function as: a monitoring unit configured to monitor a communication error in the bus; an aggregation unit configured to aggregate a communication error occurrence state regarding each piece of the identification information on the basis of a monitoring result by the monitoring unit; and a detection unit configured to detect the attack on the basis of an aggregation result by the aggregation unit.

One mode of the present disclosure can be realized not only as a detection device including such a characteristic processing unit but also as an on-vehicle communication system including the detection device. One mode of the present disclosure can be realized as a semiconductor integrated circuit that realizes a part or the entirety of the detection device.

BRIEF DESCRIPTION OF DRAWINGS

FIG. 9 shows one example of a summary table created by an aggregation unit in the gateway device according to the embodiment of the present disclosure.

FIG. 10 shows one example of a summary table created by the aggregation unit in the gateway device according to the embodiment of the present disclosure.

DESCRIPTION OF EMBODIMENTS

Figure 1:
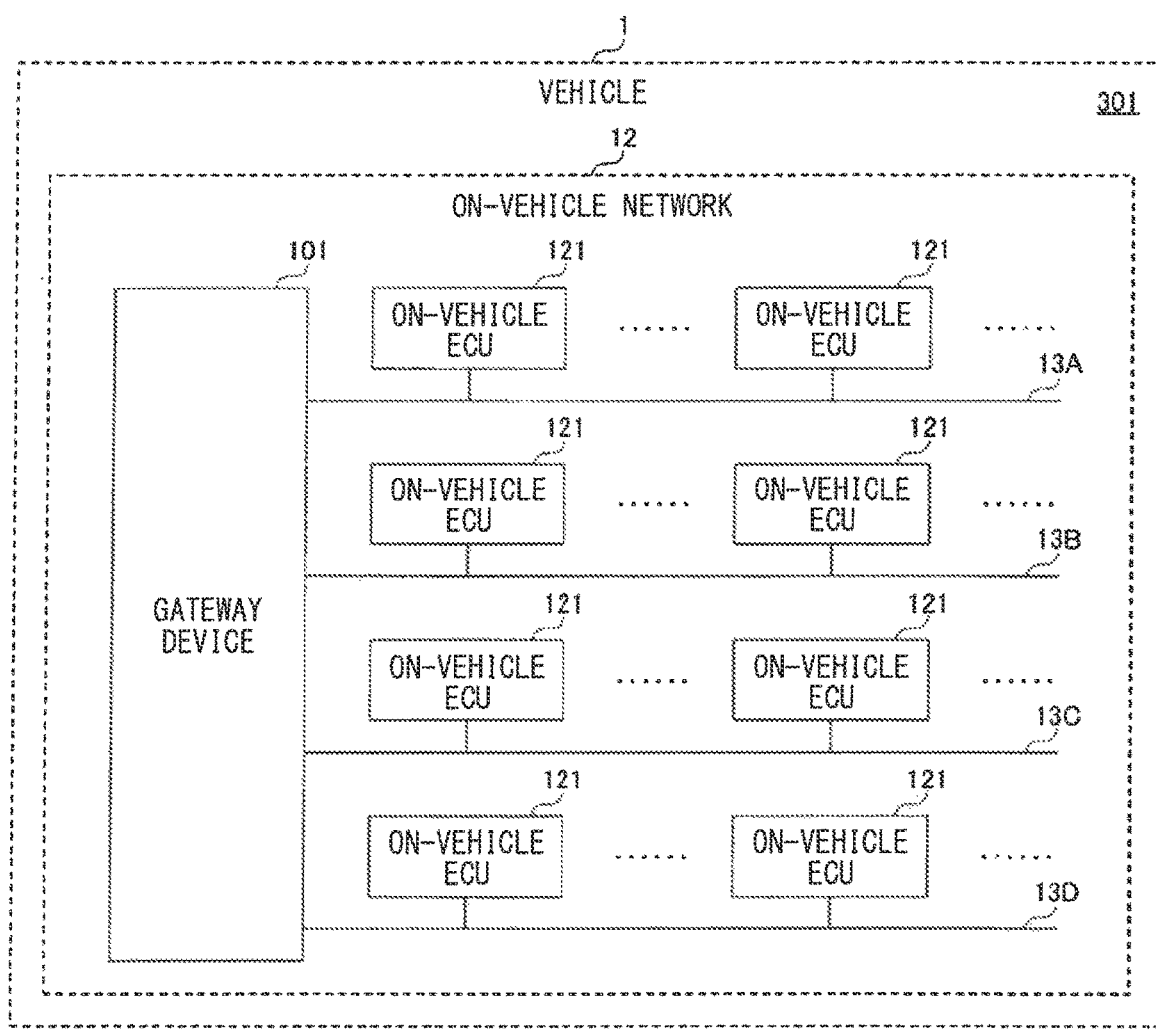
FIG. 1 shows a configuration of an on-vehicle communication system according to an embodiment of the present disclosure.

To date, on-vehicle network systems for improving security in on-vehicle networks have been developed.

Problem to be Solved by the Present Disclosure

In the on-vehicle communication system described in PATENT LITERATURE 1, a first encryption key to be used in message authentication by a first ECU and a second ECU which are connected only to an on-vehicle network is different from a second encryption key to be used by a third ECU connected to both the on-vehicle network and an external network, thereby preventing cyberattack from the external network on the first ECU and the second ECU which are not connected to the external network.

However, for example, under a cyberattack that electrically operates a signal transmitted in a bus which connects ECUs, the security measure described above could be invalidated.

In a case where such an attack has been made, a technology for accurately detecting the attack in an on-vehicle network is required.

The present disclosure has been made in order to solve the above-described problem. An object of the present disclosure is to provide a detection device, a detection method, and a detection program that can accurately detect an attack on an on-vehicle network.

Effect of the Present Disclosure

According to the present disclosure, an attack on an on-vehicle network can be accurately detected.

DESCRIPTION OF EMBODIMENT OF THE PRESENT DISCLOSURE

First, contents of an embodiment of the present disclosure are listed and described.

(1) A detection device according to an embodiment of the present disclosure is configured to detect an attack in an vehicle network that includes a bus in which a frame including identification information that allows recognition of at least one of a transmission source and a destination is transmitted. In the bus, a plurality of the frames including pieces of the identification information different from each other are transmitted. The detection device includes: a monitoring unit configured to monitor a communication error in the bus; an aggregation unit configured to aggregate a communication error occurrence state regarding each piece of the identification information on the basis of a monitoring result by the monitoring unit; and a detection unit configured to detect the attack on the basis of an aggregation result by the aggregation unit.

Due to this configuration, the communication error occurrence state regarding each on-vehicle device serving as a transmission source or a destination of the frame can be recognized on the basis of an aggregation result of the communication error occurrence state regarding each piece of identification information. Accordingly, it is possible to specify an on-vehicle device in which a communication error has occurred under such a cyberattack that electrically operates a signal transmitted in a bus, for example. Therefore, an attack in an on-vehicle network can be accurately detected.

(2) Preferably, the detection unit detects the attack on the basis of a bias in the communication error occurrence state among the pieces of identification information in the aggregation result.

Due to this configuration, on the basis of a bias in the communication error occurrence state among the pieces of identification information, it is possible to recognize whether communication errors have evenly occurred among the on-vehicle devices in the on-vehicle network, or whether communication errors have occurred in a small number of specific on-vehicle devices among the on-vehicle devices, for example. Accordingly, for example, when communication errors have evenly occurred among the on-vehicle devices, attack detection can be carefully determined also in consideration of influence of electric noise. In addition, when communication errors have occurred in a small number of specific on-vehicle devices, it is possible to determine there is a high possibility that attacks have been made.

(3) Preferably, the detection unit detects the attack on the basis of: a total, regarding each piece of the identification information, of the number of times of occurrence of the communication error; and an error ID number, which is the number of pieces of the identification information for which the communication error has occurred.

Due to this configuration, for example, when it is to be determined that attacks have been made on on-vehicle devices that have a large number of times of occurrence of communication error, the number of on-vehicle devices in which communication errors have occurred can be taken into consideration. Thus, whether or not attacks have been made can be more accurately determined.

(4) More preferably, the detection unit detects the attack on the basis of at least one of: a first comparison result between a first threshold and the total in a first monitoring interval, and a second comparison result between a second threshold and the error ID number; and a third comparison result between a third threshold and the total in a second monitoring interval composed of a plurality of the first monitoring intervals, and a fourth comparison result between a fourth threshold and an average of the error ID number.

Due to this configuration, for example, even when the total in the first monitoring interval is greater than the first threshold, if the error ID number is not less than the second threshold, it is conceivable that communication errors have widely occurred due to electric noise. Thus, an erroneous attack detection can be prevented. In addition, for example, when the total in the first monitoring interval is greater than the first threshold and the error ID number is smaller than the second threshold, communication errors have occurred in a small number of specific on-vehicle devices. Thus, attacks on the small number of specific on-vehicle devices can be more accurately detected. In addition, even when the total in the second monitoring interval is greater than the third threshold, if the average of the error ID number is not less than the fourth threshold, it is conceivable that communication errors have widely occurred due to electric noise. Thus, an erroneous attack detection can be prevented. For example, when the total in the second monitoring interval is greater than the third threshold and the average of the error ID number is smaller than the fourth threshold, communication errors have occurred in a small number of specific on-vehicle devices. Thus, attacks on the small number of specific on-vehicle devices can be more accurately detected.

(5) More preferably, the detection unit detects the attack on the basis of at least one of: the first comparison result, the second comparison result, and a comparison result between a fifth threshold greater than the second threshold and the error ID number; and the third comparison result, the fourth comparison result, and a comparison result between a sixth threshold greater than the fourth threshold and the average.

For example, when at least one of the error ID number in the first monitoring interval and the average of the error ID number the second monitoring interval is significantly large, it is considered that a large number of on-vehicle devices in the on-vehicle network are being attacked. Due to the above-described configuration, a storm of attacks on the on-vehicle devices in the on-vehicle network can be more accurately detected.

(6) A detection method according to an embodiment of the present disclosure is to be used in a detection device configured to detect an attack in an on-vehicle network that includes a bus in which a frame including identification information that allows recognition of at least one of a transmission source and a destination is transmitted. In the bus, a plurality of the frames including pieces of the identification information different from each other are transmitted. The detection method includes the steps of: monitoring a communication error in the bus; aggregating a communication error occurrence state regarding each piece of the identification information on the basis of a monitoring result; and detecting the attack on the basis of an aggregation result.

Due to this configuration, the communication error occurrence state regarding each on-vehicle device serving as a transmission source or a destination of the frame can be recognized on the basis of an aggregation result of the communication error occurrence state regarding each piece of identification information. Accordingly, it is possible to specify an on-vehicle device in which a communication error has occurred under such a cyberattack that electrically operates a signal transmitted in a bus, for example. Therefore, an attack in an on-vehicle network can be accurately detected.

(7) A detection program according to an embodiment of the present disclosure is to be used in a detection device configured to detect an attack in an on-vehicle network that includes a bus in which a frame including identification information that allows recognition of at least one of a transmission source and a destination is transmitted. In the bus, a plurality of the frames including pieces of the identification information different from each other are transmitted. The detection program is configured to cause a computer to function as: a monitoring unit configured to monitor a communication error in the bus; an aggregation unit configured to aggregate a communication error occurrence state regarding each piece of the identification information on the basis of a monitoring result by the monitoring unit; and a detection unit configured to detect the attack on the basis of an aggregation result by the aggregation unit.

Due to this configuration, the communication error occurrence state regarding each on-vehicle device serving as a transmission source or a destination of the frame can be recognized on the basis of an aggregation result of the communication error occurrence state regarding each piece of identification information. Accordingly, it is possible to specify an on-vehicle device in which a communication error has occurred under such a cyberattack that electrically operates a signal transmitted in a bus, for example. Therefore, an attack in an on-vehicle network can be accurately detected.

Hereinafter, embodiments of the present disclosure will be described with reference to the drawings. In the drawings, the same or corresponding parts are denoted by the same reference signs, and descriptions thereof are not repeated. At least some parts of the embodiments described below can be combined together as desired.

[Configuration and Basic Operation]

FIG. 1 shows a configuration of an on-vehicle communication system according to an embodiment of the present disclosure.

With reference to FIG. 1, an on-vehicle communication system 301 includes a gateway device (detection device) 101, and a plurality of on-vehicle ECUs (Electronic Control Units) 121.

The on-vehicle communication system 301 is mounted in a vehicle 1. An on-vehicle network 12 includes a plurality of on-vehicle ECUs 121 and the gateway device 101, which are examples of on-vehicle devices in the vehicle 1.

Buses 13A, 13B, 13C, and 13D are connected to the gateway device 101. Hereinafter, each of the buses 13A, 13B, 13C and 13D is also referred to as a bus 13.

The gateway device 101 need not necessarily have four buses 13 connected thereto, and may have three or fewer buses 13 or five or more buses 13 connected thereto.

Each bus 13 has a plurality of on-vehicle ECUs 121 connected thereto, for example. For example, the bus 13 is a bus according to the CAN (Controller Area Network) (registered trademark) standard described in NON PATENT LITERATURE 1 (Renesas Electronics Corporation, "CAN Nyuumonsho (CAN Introductory Guide (provisional translation)) Rev. 1.00", [online], [searched on Jun. 17, 2017], Internet <URL:https://www.renesas.com/ja-jp/doc/products/mpumcu/apn/0031rjj05b0937_canap.pdf>).

The bus 13 need not necessarily have a plurality of on-vehicle ECUs 121 connected thereto, and may have one on-vehicle ECU 121 connected thereto. The bus 13 may be a bus according to a standard of FlexRay (registered trademark), MOST (Media Oriented Systems Transport) (registered trademark), Ethernet (registered trademark), LIN (Local Interconnect Network), or the like.

The on-vehicle ECUs 121 are, for example, a TCU (Telematics Communication Unit), an automated driving ECU, an engine ECU, a sensor a navigation device, a human machine interface, a camera, and the like.

The gateway device 101 can communicate with on-vehicle ECUs 121 via buses 13. The gateway device 101 performs a process of relaying information transmitted/received between on-vehicle ECUs 121 connected to different buses 13 in the vehicle 1.

Figure 2:
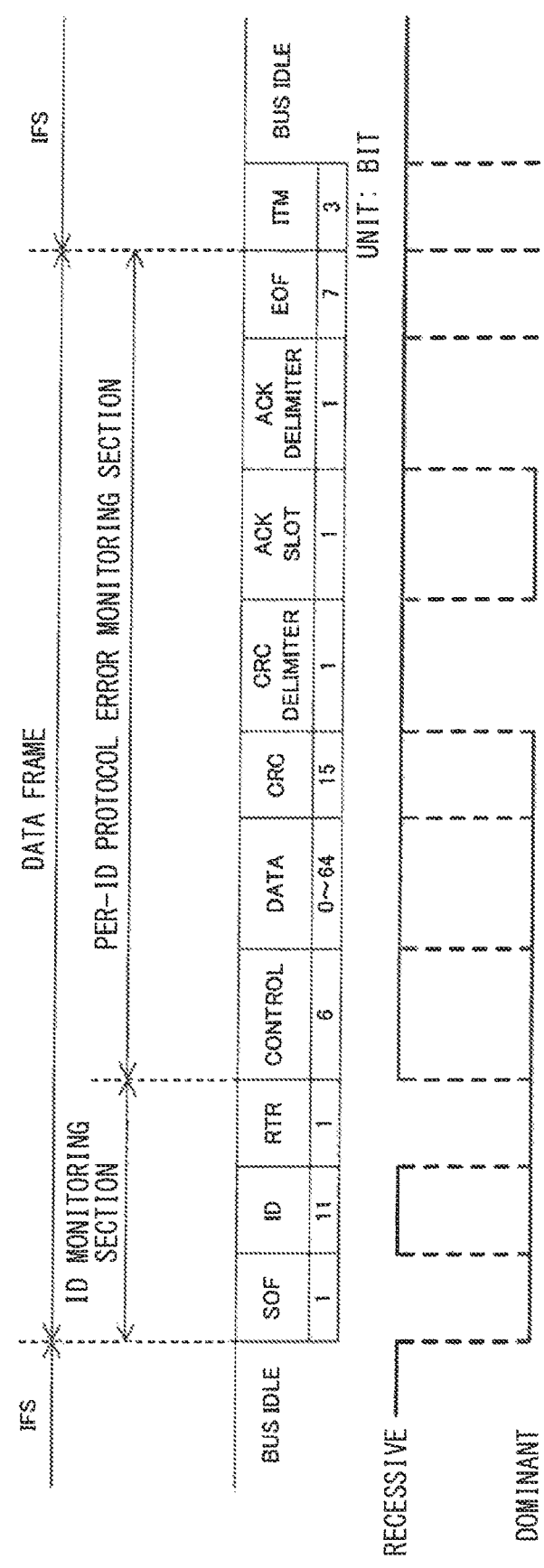
FIG. 2 shows one example of a data frame transmitted in an on-vehicle network in the on-vehicle communication system according to the embodiment of the present disclosure.

FIG. 2 shows one example of a data frame transmitted in the on-vehicle network in the on-vehicle communication system according to the embodiment of the present disclosure. In FIG. 2, a data frame in a standard format is shown.

With reference to FIG. 2, in a bus 13, the data frame is transmitted between interframe spaces IFS.

The data frame has, from the beginning, regions of SOF (Start Of Frame), ID (Identifier), RTR (Remote Transmission Request), CONTROL, DATA, CRC (Cyclic Redundancy Check), CRC DELIMITER, ACK SLOT, ACK DELIMITER, and EOF (End Of Frame).

Each region has a length of a corresponding number of bits. The level of the bit in each region is one of: recessive-fixed; dominant-fixed; and variable between either recessive or dominant.

Specifically, the SOF region has a length of 1 bit. The level of 1 bit in the SOF region is dominant-fixed.

The ID region has a length of 11 bits. The level of the 11 bits in the ID region is variable between either recessive or dominant.

The value indicated by 11 bits in the ID region (hereinafter, also referred to as CAN-ID) is one example of identification information, and allows recognition of the transmission source and the destination of the data frame.

The CAN-ID indicates the type of data included in the data frame, for example.

A plurality of data frames including CAN-IDs that are different from each other are transmitted in a bus 13 in the on-vehicle network 12.

In the on-vehicle network 12, a data frame is transmitted by broadcast, for example. For example, when an on-vehicle device connected to a bus 13 has broadcast, as a transmission node, a data frame including a CAN-ID set in advance, another on-vehicle device connected to the bus 13 operates as a reception node and receives the broadcast data frame.

At this time, the reception node determines whether or not the received data frame is necessary for the reception node itself, on the basis of the CAN-ID included in the received data frame.

In the on-vehicle network 12, one reception node determines that the received data frame is necessary for the reception node itself in some cases, and a plurality of reception nodes determine that the received data frame is necessary for the reception nodes themselves in other cases.

As described above, in the on-vehicle network 12, on the basis of the CAN-ID included in a data frame, the transmission source and the destination of the data frame can be specified.

In addition, the CAN-ID is used for providing a priority in communication arbitration, for example.

In the bus 13, an on-vehicle ECU 121 that has first transmitted a data frame acquires a transmission right, in accordance with the CAMA/CA (Carrier Sense Multiple Access with Collision Avoidance) scheme.

For example, when two or more on-vehicle ECUs 121 have started transmission of data frames at substantially the same time, arbitration is performed from the first bit of the ID regions, and an on-vehicle ECU 121 that has continuously transmitted the dominant level for the longest time is allowed to transmit the data frame. The on-vehicle ECUs 121 that have become the loser in the arbitration stop transmission of the data frames and start a reception operation.

In the on-vehicle network 12, the recessive level and the dominant level correspond to a logical value 1 and a logical value 0, respectively. Thus, a data frame that includes a smaller CAN-ID is transmitted in preference.

Figure 3:
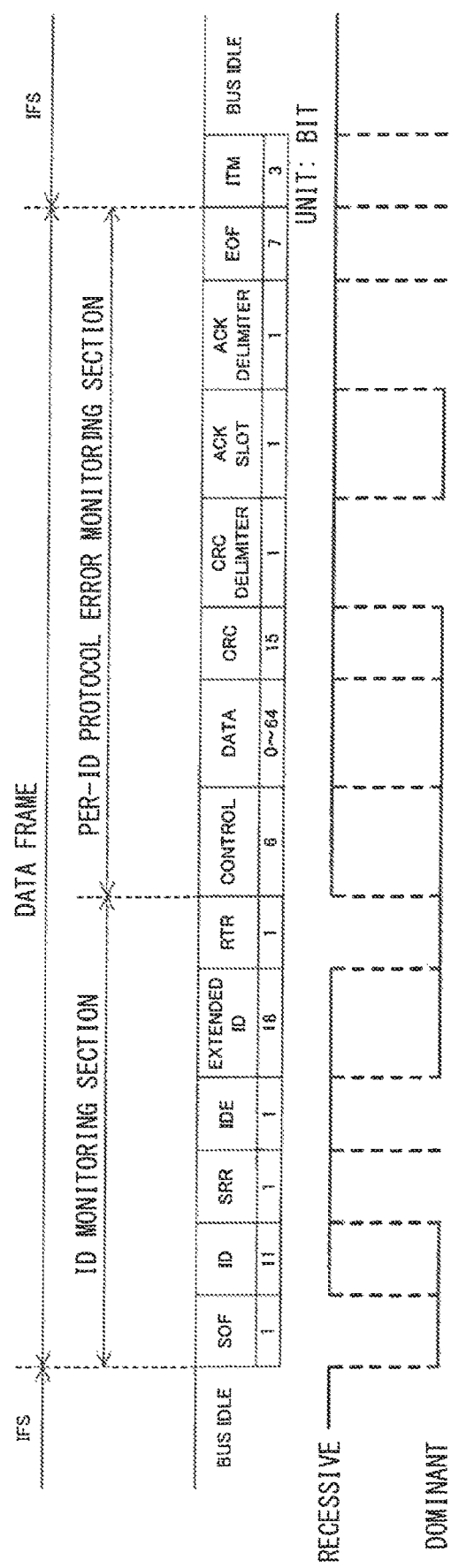
FIG. 3 shows one example of a data frame transmitted in the on-vehicle network in the on-vehicle communication system according to the embodiment of the present disclosure.

FIG. 3 shows one example of a data frame transmitted in the on-vehicle network in the on-vehicle communication system according to the embodiment of the present disclosure. In FIG. 3, a data frame in an extended format is shown.

With reference to FIG. 3, when compared with the data frame in the standard format shown in FIG. 2, the data frame in the extended format is further provided with regions of SRR (Substitute Remote Request), IDE (Identifier Extension), and EXTENDED ID, between the ID region and the RTR region.

[Bus-Off Attack]

Figure 4:
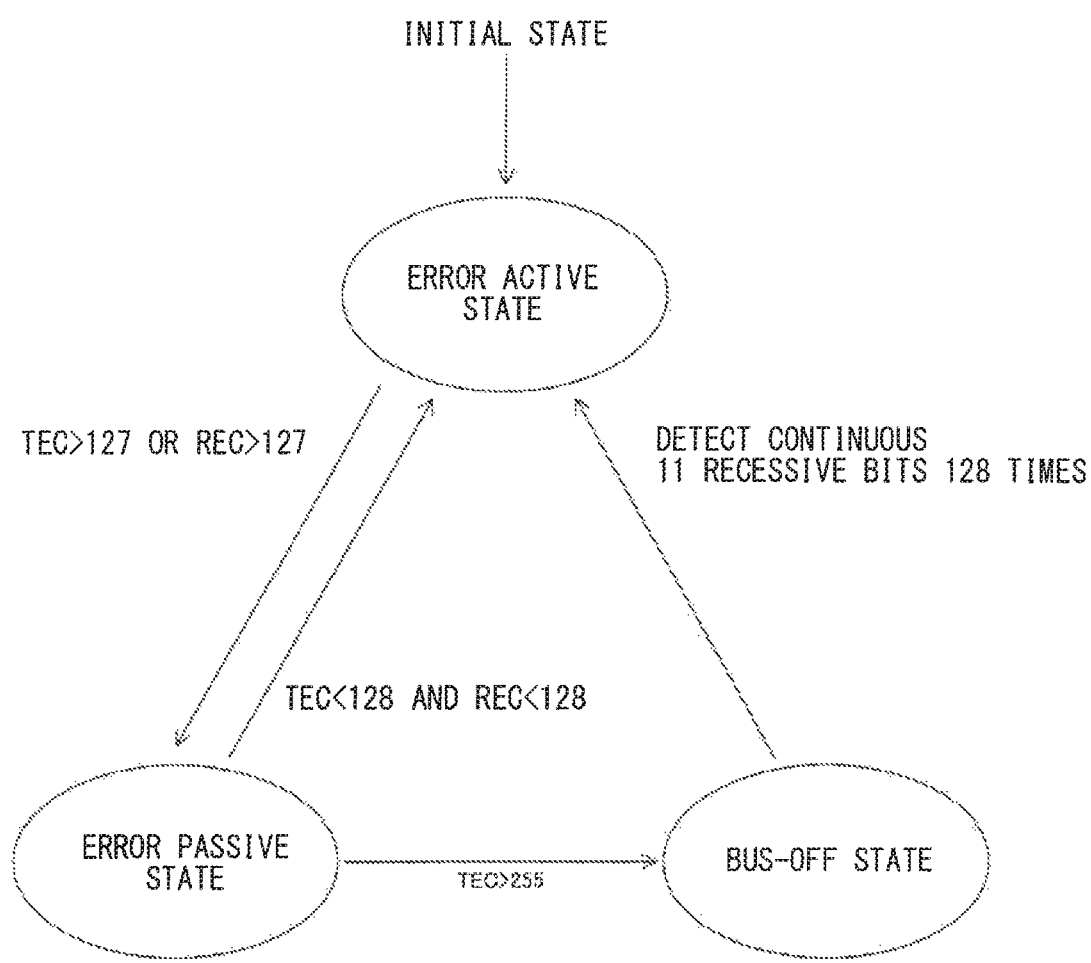
FIG. 4 shows one example of state transition of a transceiver in the on-vehicle communication system according to the embodiment of the present disclosure.

FIG. 4 shows one example of state transition of a transceiver in the on-vehicle communication system according to the embodiment of the present disclosure.

With reference to FIG. 4, the gateway device 101 and each on-vehicle ECU 121 that perform communication via a bus 13 are each provided with a transceiver. The transceiver has a transmission error counter TEC and a reception error counter REC.

The transceiver operates in accordance with a CAN communication standard, and takes one of an error active state, an error passive state, and a bus-off state.

The error active state is a state in which the transceiver can normally participate in communication on the bus 13. The error passive state is a state in inch an error easily occurs. The bus-off state is a state in which the transceiver cannot participate in communication on the bus 13 and in which all communications are inhibited.

When a transceiver in the error active state or the error passive state has detected an error, the transceiver transmits, to the bus 13, an error frame indicating that an error has been detected. In addition, for example, when the transceiver has detected an error during transmission of data in a per-ID protocol error monitoring section (see FIG. 2 and FIG. 3), the transceiver suspends transmission of a data frame in some cases.

When the transceiver has detected an error while operating as a transmitting unit, the transceiver increases the count value of the transmission error counter TEC in accordance with the content of the detected error.

When the transceiver has detected an error while operating as a receiving unit, the transceiver increases the count value of the reception error counter REC in accordance with the content of the detected error.

When the transceiver has been able to transmit a message without detecting an error while operating as a transmitting unit, the transceiver decrements the count value of the transmission error counter TEC.

When the transceiver has been able to receive a message without detecting an error while operating as a receiving unit, the transceiver decrements the count value of the reception error counter REC.

When the transceiver is activated, the transceiver enters an error active state through an initial state, for example.

A transceiver that is in the error active state transitions to the error passive state when the count value of the transmission error counter TEC or the count value of the reception error counter REC has become greater than 127.

A transceiver that is in the error passive state transitions to the error active state when both the count value of the transmission error counter TEC and the count value of the reception error counter REC have become smaller than 128.

A transceiver that is in the error passive state transitions to the bus-off state when the count value of the transmission error counter TEC has become greater than 255.

When a transceiver in the bus-off state has detected 11 continuous recessive bits 128 times on the bus 13, the transceiver resets both the count value of the transmission error counter TEC and the count value of the reception error counter REC to 0, and transitions to the error active state.

Figure 5:
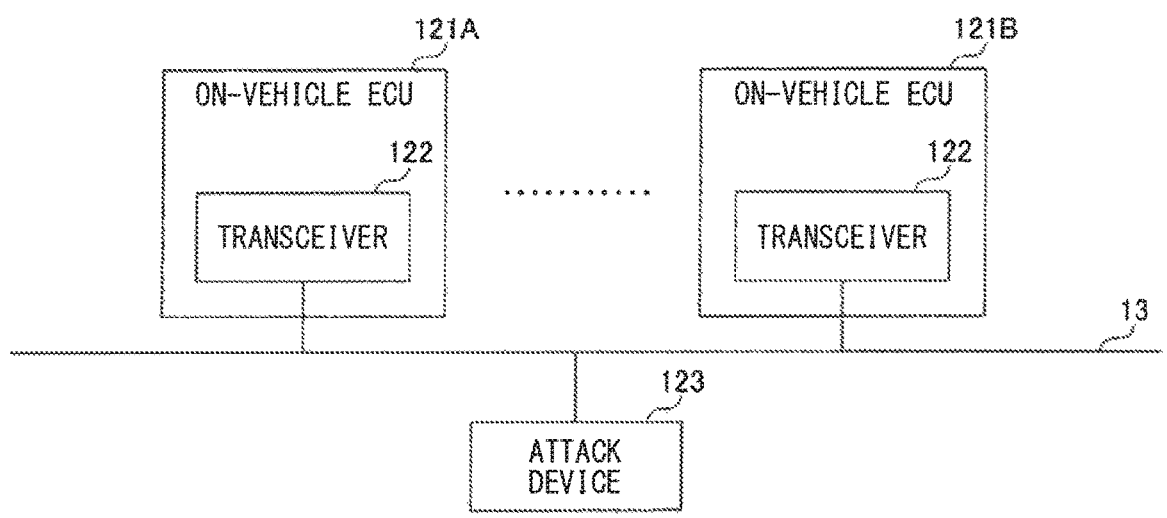
FIG. 5 illustrates an attack in the on-vehicle network according to the embodiment of the present disclosure.

FIG. 5 illustrates an attack in the on-vehicle network according to the embodiment of the present disclosure.

With reference to FIG. 5, on-vehicle ECUs 121A, 121B, which are on-vehicle ECUs 121, and an attack device 123 are connected to the bus 13. The on-vehicle ECUs 121A, 121B each include a transceiver 122.

A bus-off attack is described in NON PATENT LITERATURE 2 (K. Cho, and one other, [Error Handling of In-vehicle Networks Makes Them Vulnerable], CCS '16 Proceedings of the 2016 ACM SIGSAC Conference on Computer and Communications Security, P. 1044-1055) and NON PATENT LITERATURE 3 (Ryota Kameoka, and five others, "Bus-off attack against CAN ECU using Stuff Error injection from Raspberry Pi", 2017 Symposium on Cryptography and Information Security, 1E2-2), for example.

In the bus-off attack, the attack device 123 attacks a self-inspection function of a transceiver 122 in an on-vehicle ECU 121 of an attack target, and causes the on-vehicle ECU 121 to erroneously recognize that the transmission quality of the transceiver 122 has decreased, thereby causing the on-vehicle ECU 121 of the attack target to disjoin from the bus 13. As a result, the attacked on-vehicle ECU 121 cannot perform communication any more.

More specifically, for example, when transmitting a data frame, the transceiver 122 also performs reception at the same time, thereby confirming whether or not the same data as the data transmitted to the bus 13 is received from the bus 13.

When having received, from the bus 13, the same data as the data transmitted to the bus 13, the transceiver 122 determines that the transmission has been performed normally. Meanwhile, when having received, from the bus 13, data that is different from the data transmitted to the bus 13, the transceiver 122 determines that an error has occurred in the transmission.

More specifically, when the attack device 123 attacks the on-vehicle ECU 121B, for example, the attack device 123 overwrites a recessive bit transmitted by the on-vehicle ECU 121B, with a dominant bit, in the per-ID protocol error monitoring section (see FIG. 2 and FIG. 3).

As a result, the transceiver 122 in the on-vehicle ECU 121B receives a dominant bit although having transmitted a recessive bit. Thus, the transceiver 122 in the on-vehicle ECU 121B determines that an error has occurred in the transmission, and increases the count value of the transmission error counter TEC.

The attack device 123 repeats this attack, and accordingly, the count value of the transmission error counter TEC in the transceiver 122 of the on-vehicle ECU 121B is further increased. When the count value of the transmission error counter TEC becomes greater than 255, the transceiver 122 of the on-vehicle ECU 121B transitions to the bus-off state. As a result, the transceiver 122 cannot participate in the communication on the bus 13 any more.

[Electrical Data Falsification Attack]

Figure 6:
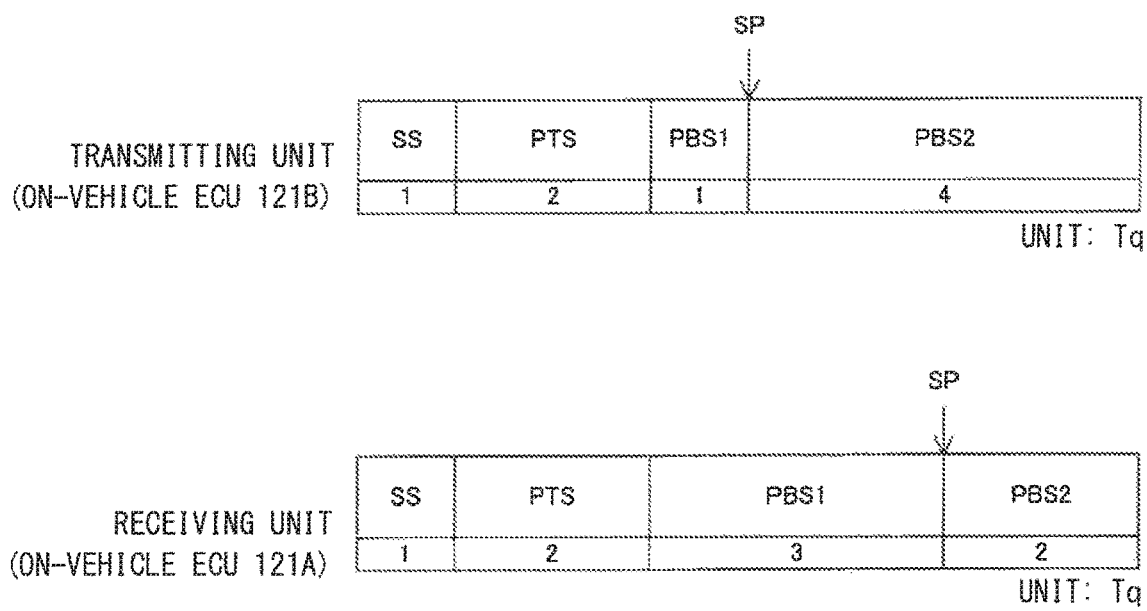
FIG. 6 illustrates an electrical data falsification attack in the on-vehicle network according to the embodiment of the present disclosure.

FIG. 6 illustrates an electrical data falsification attack in the on-vehicle network according to the embodiment of the present disclosure.

With reference to FIG. 6, a synchronization segment SS, a propagation time segment PTS, a phase buffer segment PBS1, and a phase buffer segment PBS2 are included in the period of 1 bit in a data frame shown in FIG. 2 and FIG. 3.

Each segment is formed in terms of a minimum time unit called Tq (Time quantum). The number of Tq of SS is fixed to 1. The number of Tq of each of PTS, PBS1, and PBS2 can be set to an arbitrary value in a predetermined range.

A sampling point SP is provided between PBS1 and PBS2. In the on-vehicle network 12, the numbers of Tq of PTS, PBS1, and PBS2 are set to various values for each on-vehicle ECU 121. Thus, the sampling point SP of each on-vehicle ECU 121 in the on-vehicle network 12 are varied in general.

An electrical data falsification attack is described in NON PATENT LITERATURE 4 (Yoshifumi Nakayama, and three others, "Shasai CAN basu niokeru denkiteki deeta kaizan no kouka (Effect of electrical data falsification in on-vehicle CAN bus (provisional translation))", 2017 Symposium on Cryptography and Information Security, 1E2-3).

In an electrical data falsification attack, an attack is made onto a receiving unit that has a sampling point SP that is later than the sampling point SP of a transmitting unit.

For example, in FIG. 5, a situation is assumed in which the transceiver 122 in the on-vehicle ECU 121B and the transceiver 122 in the on-vehicle ECU 121A operate as a transmitting unit and a receiving unit, respectively.

In this example, the sampling point SP in the transmitting unit is at the fourth Tq from the beginning of a bit, and the sampling point SP in the receiving unit is at the sixth Tq from the beginning of a bit.

The attack device 123 does not perform falsification at the sampling point SP of the transmitting unit, and transmits, to the bus 13, an electric signal for data falsification at the sampling point SP of the receiving unit, thereby falsifying the data from the transmitting unit. Accordingly, it becomes possible to falsify data to be received by the receiving unit, while avoiding bit error detection in the transmitting unit.

More specifically, in a case where the transmitting unit transmits a data bit, the attack device 123 transmits, to the bus 13, an electric signal for falsifying the data bit in a time period after the fourth Tq from the beginning of the bit and before the sixth Tq.

The transmitting unit acquires, at the sampling point at the fourth Tq, the data bit transmitted by the transmitting unit itself, and thus, determines that the transmission has been performed normally.

Meanwhile, the receiving unit acquires, at the sixth Tq, an unauthorized data bit which has been falsified by the attack device 123.

In such an electrical data falsification attack, neither the transmitting unit nor the receiving unit detects an error.

However, as described above, since the sampling points SP of the respective on-vehicle ECUs 121 are varied, it is considered to be difficult to perform electrical data falsification attacks, without any error being detected by any of the on-vehicle ECUs 121 in the on-vehicle network 12.

Therefore, in general, some of the on-vehicle ECUs 121 in the on-vehicle network 12 detect electrical data falsification attacks, and transmit error frames to the bus 13.

A technology that allows more accurate detection of an attack in the on-vehicle network 12 as described above, such as a bus-off attack and an electrical data falsification attack, is desired.

Thus, a gateway device according to the embodiment of the present disclosure solves the problem by the configuration and operation described below.

[Configuration of Gateway Device 101]

Figure 7:
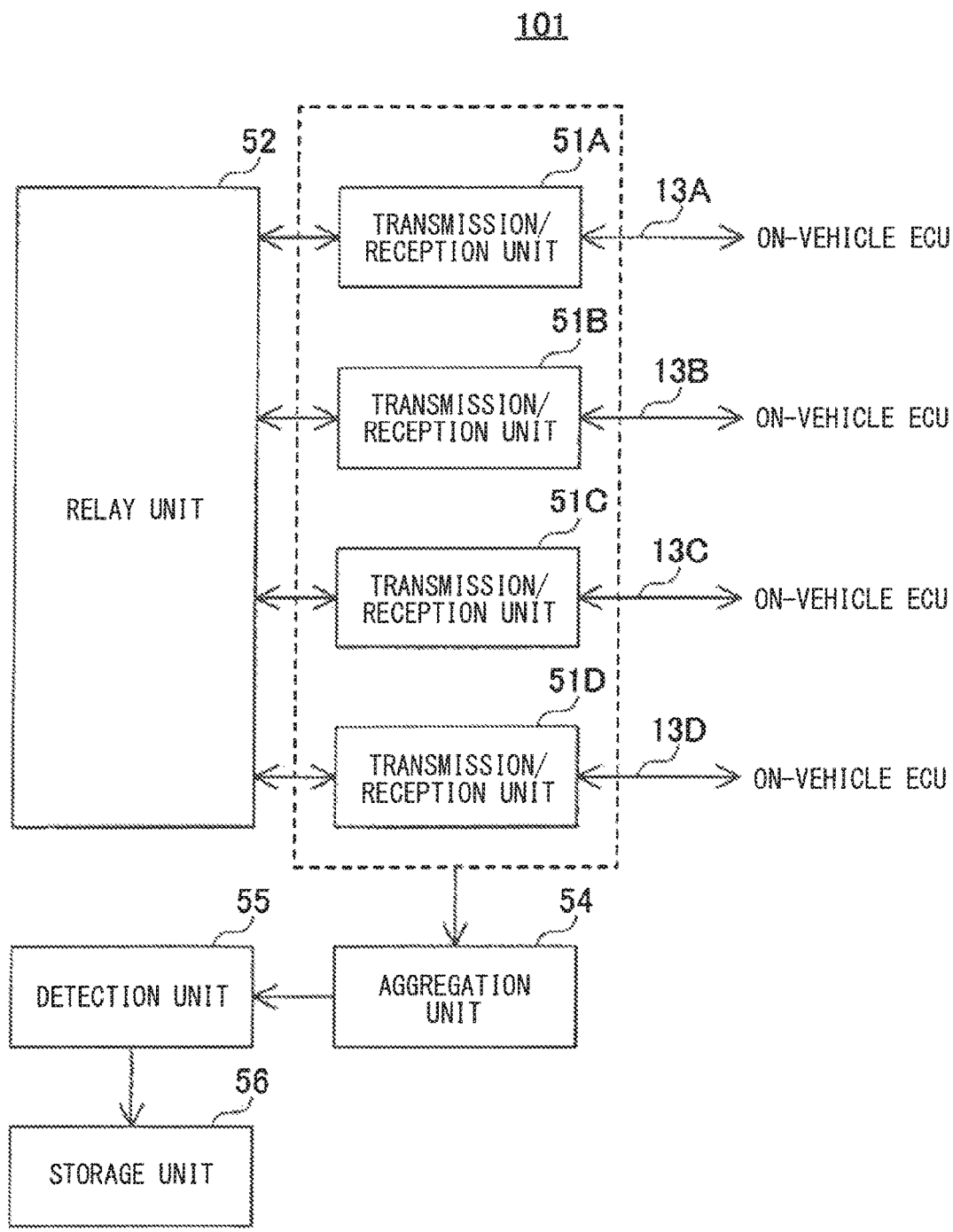
FIG. 7 shows a configuration of a gateway device in the on-vehicle communication system according to the embodiment of the present disclosure.

FIG. 7 shows a configuration of the gateway device in the on-vehicle communication system according to the embodiment of the present disclosure.

With reference to FIG. 7, the gateway device 101 includes transmission/reception units (monitoring unit) 51A, 51B, 51C, and 51D, a relay unit 52, an aggregation unit 54, a detection unit 55, and a storage unit 56. Hereinafter, each of the transmission/reception units 51A, 51B, 51C, and 51D is also referred to as a transmission/reception unit 51.

The gateway device 101 need not necessarily include four transmission/reception units 51, and may include three or fewer or five or more transmission/reception units 51.

The gateway device 101 functions as a detection device, and detects attacks in the on-vehicle network 12 including buses 13 through which data frames including identification information are transmitted.

More specifically, each transmission/reception unit 51 in the gateway device 101 is a transceiver, for example, and is connected to a bus 13. Specifically, the transmission/reception units 51A, 51B, 51C, and 51D are connected to the buses 13A, 13B, 13C, and 13D, respectively.

When a transmission/reception unit 51 receives a data frame from the bus 13 to which the transmission/reception unit 51 itself is connected, the transmission/reception unit 51 acquires a CAN-ID from the level of each bit received in an ID monitoring section (see FIG. 2 and FIG. 3).

On the basis of the acquired CAN-ID, the transmission/reception unit 51 determines whether or not the received data frame is a frame that needs to be relayed.

When having determined that the received data frame is a frame that needs to be relayed, the transmission/reception unit 51 outputs the data frame to the relay unit 52.

The relay unit 52 performs a process of relaying a data frame. Specifically, for example, when the relay unit 52 has received a data frame from the transmission/reception unit 51A, the relay unit 52 specifies a transmission/reception unit 51 to which the data frame is to be outputted, on the basis of the CAN-ID included in the received data frame.

More specifically, the relay unit 52 has a table that indicates a correspondence relationship between CAN-IDs and the transmission/reception units 51, for example. In this example, on the basis of the correspondence relationship, the relay unit 52 specifies the transmission/reception unit 51B as the transmission/reception unit 51 that corresponds to the CAN-ID. Then, the relay unit 52 outputs the data frame to the transmission/reception unit 51B.

Upon receiving the data frame from the relay unit 52, the transmission/reception unit 51B transmits the received data frame to the bus 13B.

In addition, each transmission/reception unit 51 monitors a communication error in a bus 13. More specifically, after a transmission/reception unit 51 has acquired a CAN-ID in the ID monitoring section, the transmission/reception unit 51 monitors the bit string in the per-ID protocol error monitoring section.

For example, when a transmission/reception unit 51 has detected suspension of transmission of a data frame by an on-vehicle ECU 121 as a transmission source, and when the transmission/reception unit 51 has received an error frame, the transmission/reception unit 51 determines that a communication error has occurred.

Then, the transmission/reception unit 51 notifies the aggregation unit 54 of the CAN-ID of the data frame for which the transmission/reception unit 51 has determined that a communication error has occurred.

Figure 8:
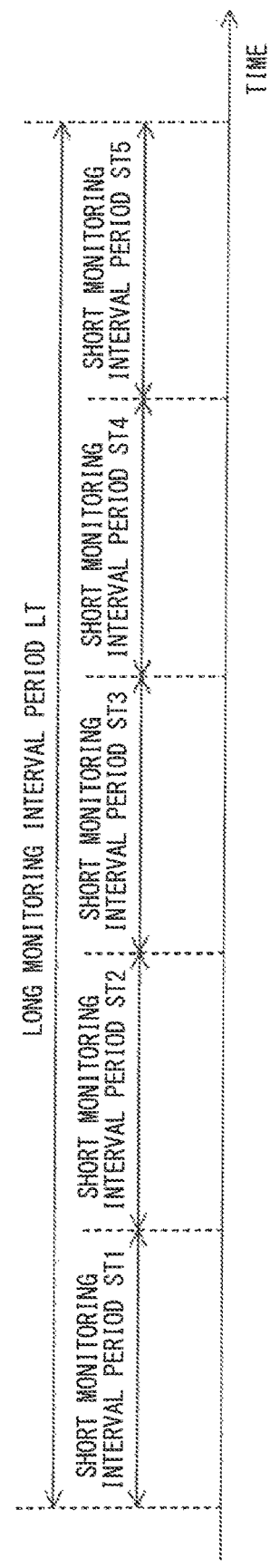
FIG. 8 shows one example of a long monitoring interval period and a short monitoring interval period that are used in the gateway device according to the embodiment of the present disclosure.

FIG. 8 shows one example of a long monitoring interval period and a short monitoring interval period that are used in the gateway device according to the embodiment of the present disclosure. In FIG. 8, the horizontal axis represents time.

With reference to FIG. 8, on the basis of a monitoring result by the transmission/reception unit 51, the aggregation unit 54 aggregates the communication error occurrence state regarding each piece of identification information.

More specifically, for example, the aggregation unit 54 sets a long monitoring interval period LT that includes short monitoring interval periods ST1, ST2, ST3, ST4, and ST5. The short monitoring interval periods ST1 to ST5 are continuous with each other. Hereinafter, each of the short monitoring interval periods ST1, ST2, ST3, ST4, and ST5 is also referred to as a short monitoring interval period ST.

The aggregation unit 54 need not necessarily set the long monitoring interval period LT that includes five short monitoring interval periods ST, and may set a long monitoring interval period LT that includes two, three, four, six, or more short monitoring interval periods ST.

FIG. 9 shows one example of a summary table created by the aggregation unit in the gateway device according to the embodiment of the present disclosure.

With reference to FIG. 9, for example, the aggregation unit 54 creates and holds, for each transmission/reception unit 51, a summary table Tbl1 that includes a total value of the number of times of occurrence of communication error in each short monitoring interval period ST, and a total value of the number of times of occurrence of communication error in the long monitoring interval period LT. The summary table Tbl1 shown in FIG. 9 is a summary table for the transmission/reception unit 51A, for example.

The summary table Tbl1 is provided with rows that correspond to the number of CAN-IDs used in the on-vehicle network 12, and in each row, fields corresponding to the short monitoring interval period ST1 to ST5 and the long monitoring interval period LT are provided.

Every time the aggregation unit 54 receives a notification of a CAN-ID from the transmission/reception unit 51A, the aggregation unit 54 performs the following process.

That is, in the summary table Tbl1, in a row that corresponds to the notified CAN-ID, the aggregation unit 54 increments the number of times of occurrence of protocol error in a field that corresponds to the short monitoring interval period ST that includes the timing at which the notification has been received.

Specifically, for example, when the aggregation unit 54 has received a notification of "1" as the CAN-ID from the transmission/reception unit 51A in the short monitoring interval period ST1, the aggregation unit 54 increments the number of times of occurrence of protocol error in a field that corresponds to the short monitoring interval period ST1 in the row whose CAN-ID is "1".

As a result of the aggregation unit 54 performing such a process, when the short monitoring interval period ST1 is completed, 5 times, 5 times, and 0 times are respectively recorded, in the rows whose CAN-IDs are "1", "2", and "N" in the summary table Tbl1, as the number of times of occurrence of protocol error in the fields that correspond to the short monitoring interval period ST1.

The aggregation unit 54 performs the same process also in the short monitoring interval period ST2 to the short monitoring interval period ST5.

Then, when the long monitoring interval period LT is completed, the aggregation unit 54 writes, into the summary table Tbl1, the number of times of occurrence of protocol error regarding each CAN-ID in the long monitoring interval period LT.

More specifically, the aggregation unit 54 calculates, for each CAN-ID, a total value of the numbers of times of occurrence of protocol error in the short monitoring interval periods ST1 to ST5.

For each CAN-ID, the aggregation unit 54 writes the calculated total value into a field that corresponds to the long monitoring interval period LT in the row of the CAN-ID.

Specifically, for example, in the row whose CAN-ID is "1", the aggregation unit 54 performs calculation and obtains 50 as a total value of the numbers of times of occurrence of protocol error in the short monitoring interval periods ST1 to ST5.

The aggregation unit 54 writes the calculated 50 into a field that corresponds to the long monitoring interval period LT in the row whose CAN-ID is "1".

FIG. 10 shows one example of a summary table created by the aggregation unit in the gateway device according to the embodiment of the present disclosure.

With reference to FIG. 10, for example, the aggregation unit 54 creates and holds, for each transmission/reception unit 51, a summary table Tbl2 that includes an intra-bus protocol error distribution in each short monitoring interval period ST and an average of the intra-bus protocol error distribution in the long monitoring interval period LT. The summary table Tbl2 shown in FIG. 10 is a summary table for the transmission/reception unit 51A, for example.

The summary table Tbl2 is provided with fields that respectively correspond to the short monitoring interval period ST1 to ST5 and the long monitoring interval period LT.

When a short monitoring interval period ST is completed, the aggregation unit 54 calculates an intra-bus protocol error distribution in the short monitoring interval period ST, and writes the calculated intra-bus protocol error distribution into a field that corresponds to the short monitoring interval period ST.

Here, the intra-bus protocol error distribution is one example of an error ID number, which is the number of pieces of identification information for which communication errors have occurred. Specifically, the intra-bus protocol error distribution is the number of CAN-IDs that each have 1 or greater as the number of times of occurrence of protocol error in a short monitoring interval period ST.

Specifically, for example, when the short monitoring interval period ST1 is completed, since the CAN-ID that has 1 or greater as the number of times of occurrence of protocol error is "1" and "2" in the short monitoring interval period ST1, the aggregation unit 54 performs calculation and obtains 2 as the intra-bus protocol error distribution.

Then, the aggregation unit 54 writes the calculated 2 into a field that corresponds to the short monitoring val period ST1.

Also when each of the short monitoring interval period ST2 to the short monitoring interval period ST5 is completed, the aggregation unit 54 performs the same process.

Then, when the long monitoring interval period LT is completed, the aggregation unit 54 writes the average of the intra-bus protocol error distribution in the long monitoring interval period LT, into a field that corresponds to the long monitoring interval period LT.

Specifically, the aggregation unit 54 performs calculation and obtains 1.4, which is a value obtained by dividing (2+2+1+1+1) by 5, as the average of the intra-bus protocol error distributions in the respective short monitoring interval periods ST1 to ST5.

The aggregation unit 54 writes the calculated 1.4 into a field that corresponds to the long monitoring interval period LT.

With reference to FIG. 7 again, the detection unit 55 detects an attack in the on-vehicle network 12 on the basis of the aggregation result by the aggregation unit 54.

Specifically, for example, the detection unit 55 detects an attack in the on-vehicle network 12 on the basis of a bias in the communication error occurrence state among CAN-IDs in the aggregation result.

More specifically, for example, the detection unit 55 detects an attack in the on-vehicle network 12 on the basis of: the total, regarding each CAN-ID, of the number of times of occurrence of communication error; and an intra-bus protocol error distribution.

For example, for each short monitoring interval, the detection unit 55 performs a short interval detection process. Specifically, for example, the detection unit 55 detects an attack in the on-vehicle network 12 on the basis of a comparison result Rst1 between a threshold Th1 and the total, regarding each CAN-ID, of the number of times of occurrence of communication error in a short monitoring interval period ST, a comparison result Rst2 between a threshold Th2 and the intra-bus protocol error distribution, and a comparison result Rst5 between a threshold Th5 greater than the threshold Th2 and the intra-bus protocol error distribution.

More specifically, for example, the detection unit 55 operates according to the short monitoring interval periods ST1, ST2, ST3, ST4, and ST5 and the long monitoring interval period LT set by the aggregation unit 54. When the short monitoring interval period ST1 is completed, the detection unit 55 performs the following process.

That is, from the summary table Tbl1 (see FIG. 9) held by the aggregation unit 54, the detection unit 55 acquires a total value, regarding each CAN-ID, of the number of times of occurrence of protocol error in the short monitoring interval period ST1.

In addition, from the summary table Tbl2 (see FIG. 10) held by the aggregation unit 54, the detection unit 55 acquires an intra-bus protocol error distribution in the short monitoring interval period ST1.

The detection unit 55 selects, one by one by one, CAN-IDs in an ascending order from CAN-IDs of "1" to "N", for example, and performs an evaluation using the number of times of occurrence of protocol error that corresponds to the selected CAN-ID.

Specifically, for example, when the total of the number of times of occurrence of protocol error corresponding to the selected CAN-ID (hereinafter, also referred to as a target CAN-ID) is greater than the threshold Th1 and the intra-bus protocol error distribution is smaller than the threshold Th2, the detection unit 55 determines that a small number of attacks, which are cyberattacks on a small number of on-vehicle ECUs 121, have occurred. The detection unit 55 records the determination result as a log into the storage unit 56.

For example, when cyberattacks have been made on one or two on-vehicle ECUs 121, the number of times of occurrence of protocol error regarding the CAN-ID included in the data frame for which each cyberattacked on-vehicle ECU 121 serves as a transmission source or a destination, becomes large. Meanwhile, the number of CAN-IDs that indicate the cyberattacked on-vehicle ECUs 121 each serving as a transmission source or a destination, is small. Thus, the intra-bus protocol error distribution does not become large. Due to the above-described configuration, the detection unit 55 can more accurately determine that a small number of attacks have occurred.

For example, when the total of the number of times of occurrence of protocol error corresponding to the target CAN-ID is greater than the threshold Th1 and the intra-bus protocol error distribution is greater than the threshold Th5, the detection unit 55 determines that a large number of attacks, which are cyberattacks on a large number of on-vehicle ECUs 121, have occurred. The detection unit 55 records the determination result as a log into the storage unit 56.

For example, when cyberattacks have been made on a large number of on-vehicle ECUs 121, the number of times of occurrence of protocol error regarding the CAN-ID included in the data frame for which each cyberattacked on-vehicle ECU 121 serves as a transmission source or a destination, becomes large. In addition, the number of CAN-IDs that indicate the cyberattacked on-vehicle ECUs 121 each serving as a transmission source or a destination, is also large. Thus, the intra-bus protocol error distribution becomes significantly large. Due to the above-described configuration, the detection unit 55 can more accurately determine that a large number of attacks have occurred.

For example, when the total of the number of times of occurrence of protocol error corresponding to the target CAN-ID is not greater than the threshold Th1, or the intra-bus protocol error distribution is not less than the threshold Th2 and not greater than the threshold Th5, the detection unit 55 determines that communication errors due to noise, a failure of an on-vehicle ECU 121, or the like has occurred. In this case, the detection unit 55 does not record the determination result into the storage unit 56.

For example, since noise occurs at random in many cases, data frames for which communication errors occur also appear at random. Therefore, the intra-bus protocol error distribution becomes large. In a case where an on-vehicle ECU 121 is deteriorated over time, it is considered that communication errors of data frames for which the on-vehicle ECU 121 serves as a transmission source or a destination sporadically occur. Therefore, although the intra-bus protocol error distribution is small, the number of times of occurrence of protocol error regarding the CAN-ID included in the data frame for which the on-vehicle ECU 121 serves as a transmission source or a destination, is also small. Due to the above-described configuration, the detection unit 55 can prevent making an erroneous determination as to occurrence of a small number of attacks or a large number of attacks.

Also in each case where the short monitoring interval period ST2, ST3, ST4, ST5 set by the aggregation unit 54 is completed, for example, the detection unit 55 performs the short interval detection process, similar to the case where the short monitoring interval period ST1 is completed.

In addition, for example, the detection unit 55 performs a long interval detection process for each long monitoring interval. Specifically, for example, the detection unit 55 detects an attack in the on-vehicle network 12 on the basis of a comparison result Rst3 between a threshold Th3 and the total, regarding each CAN-ID, of the number of times of occurrence of communication error in the long monitoring interval period LT, a comparison result Rst4 between a threshold Th4 and the average of the intra-bus protocol error distribution, and a comparison result Rst6 between a threshold Th6 greater than the threshold Th4 and the average.

More specifically, when the long monitoring interval period LT is completed, the detection unit 55 acquires, from the summary table Tbl1 (see FIG. 9) held by the aggregation unit 54, a total value, regarding each CAN-ID, of the number of times of occurrence of protocol error in the long monitoring interval period LT.

In addition, from the summary Tbl2 (FIG. 10) held by the aggregation unit 54, the detection unit 55 acquires an average of intra-bus protocol error distribution in the long monitoring interval period LT.

The detection unit 55 selects, one by one, CAN-IDs in an ascending order from CAN-IDs of "1" to "N", for example, and performs an evaluation using the number of times of occurrence of protocol error that corresponds to the selected CAN-ID.

Specifically, for example, when the total of the number of times of occurrence of protocol error corresponding to a selected CAN-ID, i.e., a target CAN-ID, is greater than the threshold Th3 and the average of the intra-bus protocol error distribution is smaller than the threshold Th4, the detection unit 55 determines that a small number of attacks have occurred. The detection unit 55 records the determination result as a log into the storage unit 56.

For example, when cyberattacks have been made on one or two on-vehicle ECUs 121, the number of times of occurrence of protocol error regarding the CAN-ID included in the data frame for which each cyberattacked on-vehicle ECU 121 serves as a transmission source or a destination, becomes large. Meanwhile, the number of CAN-IDs that indicate the cyberattacked on-vehicle ECUs 121 each serving as a transmission source or a destination, is small. Thus, the average of the intra-bus protocol error distribution does not become large. Due to the above-described configuration, the detection unit 55 can more accurately determine that a small number of attacks have occurred.

For example, when the total of the number of times of occurrence of protocol error corresponding to the target CAN-ID is greater than the threshold Th3 and the average of the intra-bus protocol error distribution is greater than the threshold Th6, the detection unit 55 determines that a large number of attacks have occurred. The detection unit 55 records the determination result as a log into the storage unit 56.

For example, when cyberattacks have been made on a large number of on-vehicle ECUs 121, the number of times of occurrence of protocol error regarding the CAN-ID included in the data frame for which each cyberattacked on-vehicle ECU 121 serves as a transmission source or a destination, becomes large. In addition, the number of CAN-IDs that indicate the cyberattacked on-vehicle ECUs 121 each serving as a transmission source or a destination, is also large. Thus, the average of the intra-bus protocol error distribution becomes significantly large. Due to the above-described configuration, the detection unit 55 can more accurately determine that a large number of attacks have occurred.

For example, when the total of the number of times of occurrence of protocol error corresponding to the target CAN-ID is not greater than the threshold Th3 or the average of the intra-bus protocol error distribution is not less than the threshold Th4 and not greater than the threshold Th6, the detection unit 55 determines that communication errors due to noise, a failure of an on-vehicle ECU 121, or the like has occurred. In this case, the detection unit 55 does not record the determination result into the storage unit 56.

For example, since noise occurs at random in many cases, data frames for which communication errors occur also appear at random. Therefore, the average of the intra-bus protocol error distribution becomes large. In a case where an on-vehicle ECU 121 is deteriorated over time, it is considered that communication errors of data frames for which the on-vehicle ECU 121 serves as a transmission source or a destination sporadically occur. Therefore, although the average of the intra-bus protocol error distribution is small, the number of times of occurrence of protocol error regarding the CAN-ID included in the data frame for which the on-vehicle ECU 121 serves as a transmission source or a destination, is also small. Due to the above-described configuration, the detection unit 55 can prevent making an erroneous determination as to occurrence of a small number of attacks or a large number of attacks.

[Operation Flow]

The gateway device 101 includes a computer. An arithmetic processing unit such as a CPU in the computer reads out a program including a part or all of steps in the flow chart shown below from a memory (not shown), and executes the program. The program for this device can be installed from outside. The program for this device is distributed in a state of being stored in a storage medium.

Figure 11:
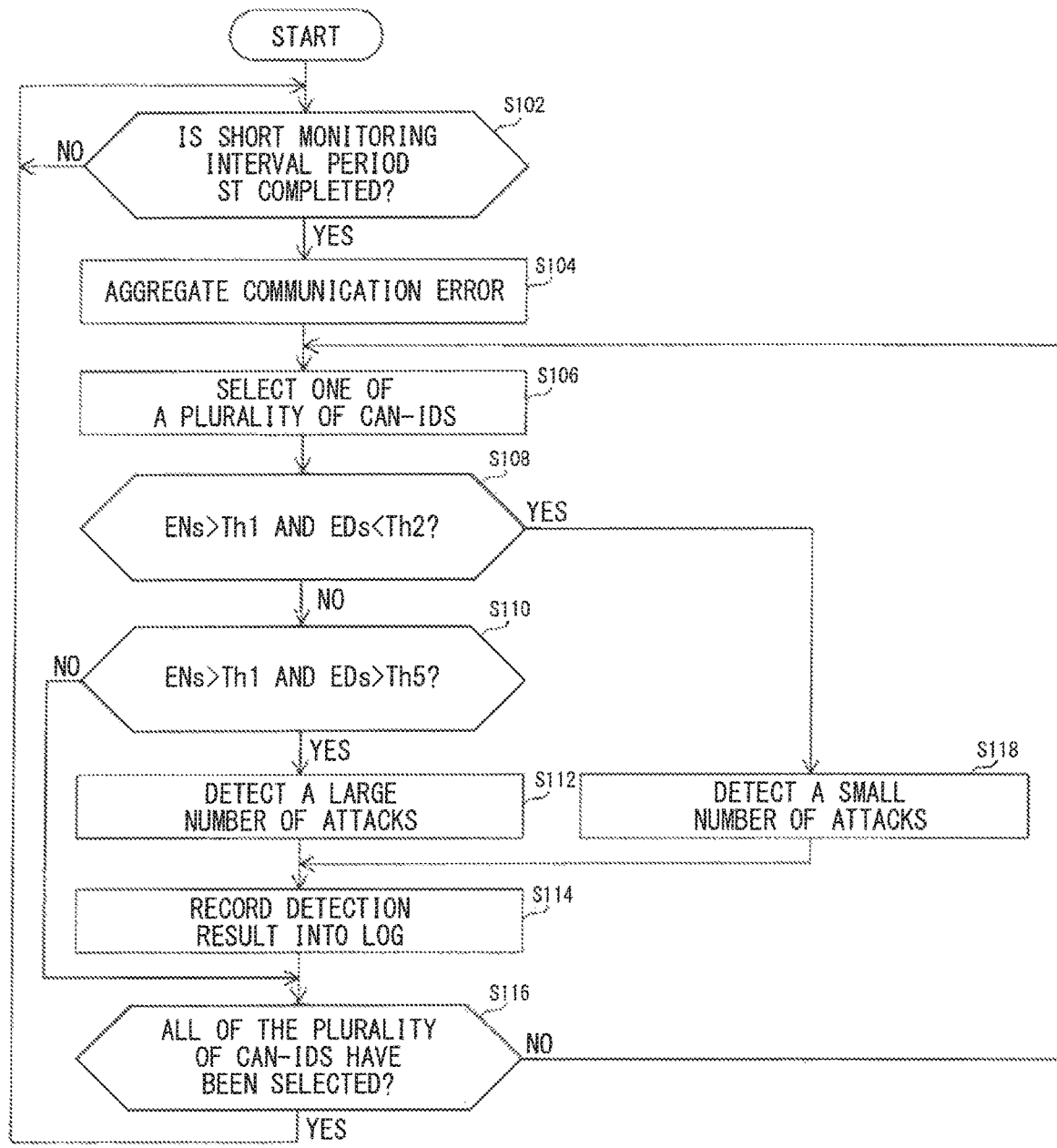
FIG. 11 is a flow chart of an operation procedure along which the gateway device according to the embodiment of the present disclosure detects a cyberattack.

FIG. 11 is a flow chart of an operation procedure along which the gateway device according to the embodiment of the present disclosure detects a cyberattack.

With reference to FIG. 11, first, until a short monitoring interval period ST is completed, the gateway device 101 records communication errors that have occurred, while performing a process of relaying data frames (NO in step S102).

Then, upon completion of the short monitoring interval period ST (YES in step S102), the gateway device 101 aggregates communication errors that have occurred in the short monitoring interval period ST (step S104).

Next, the gateway device 101 selects one of a plurality of CAN-IDs used in the on-vehicle network 12 (step S106).

Next, when a total (ENs), in the short monitoring interval period ST, of the number of times of occurrence of protocol error corresponding to the selected CAN-ID, i.e., a target CAN-ID, is greater than the threshold Th1 and an intra-bus protocol error distribution EDs in the short monitoring interval period ST is smaller than the threshold Th2 (YES in step S108), the gateway device 101 detects a small number of attacks (step S118).

When the total ENs is greater than the threshold Th1 and the intra-bus protocol error distribution EDs is greater than the threshold Th5 (NO in step S108 and YES in step S110), the gateway device 101 detects a large number of attacks (step S112).

Next, when having detected a small number of attacks (step S118) or having detected a large number of attacks (step S112), the gateway device 101 records a detection result in a log (step S114).

When the total ENs is not greater than the threshold Th1 or the intra-bus protocol error distribution EDs is not less than the threshold Th2 and not greater than the threshold Th5 (NO in step S108 and NO in step S110), or when the gateway device 101 has recorded a detection result in a log (step S114), the gateway device 101 confirms whether or not all of the plurality of CAN-IDs used in the on-vehicle network 12 have been selected (step S116).

When there is any unselected CAN-ID in the plurality of CAN-IDs (NO in step S116), the gateway device 101 selects one unselected CAN-ID in the plurality of CAN-IDs (step S106).

Meanwhile, when having selected all of the plurality of CAN-IDs (YES in step S116), the gateway device 101 records communication errors that have occurred, while performing a process of relaying data frames until a new short monitoring interval period ST is completed (NO in step S102).

Figure 12:
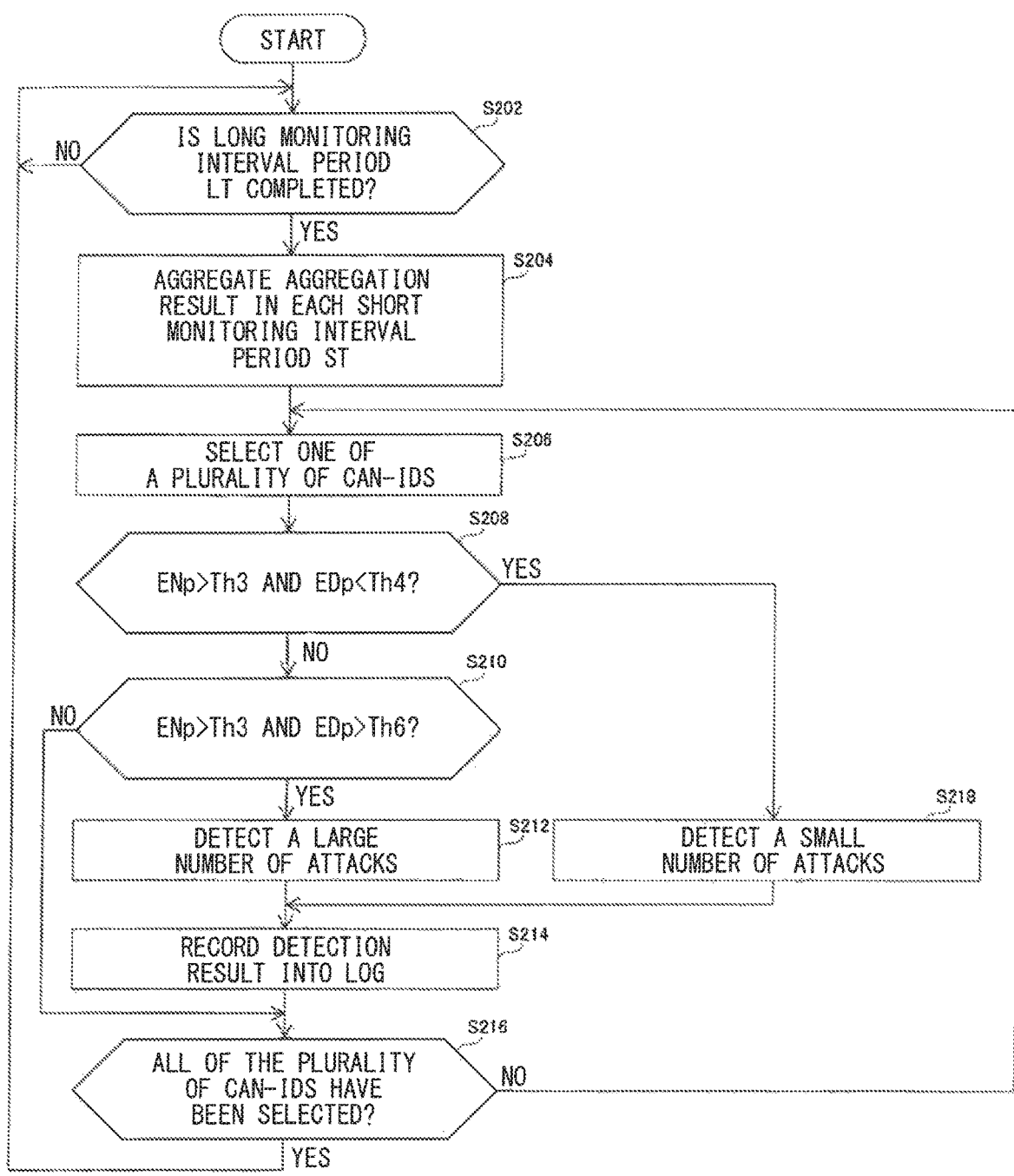
FIG. 12 is a flow chart of an operation procedure along which the gateway device according to the embodiment of the present disclosure detects a cyberattack.

FIG. 12 is a flow chart of an operation procedure along which the gateway device according to the embodiment of the present disclosure detects a cyberattack.

With reference to FIG. 12, until a long monitoring interval period LT is completed, while performing a process of relaying data frames, the gateway device 101 records communication errors that have occurred in each short monitoring interval period ST included in the long monitoring interval period LT (NO in step S202).

Then, upon completion of the long monitoring interval period LT (YES in step S202), the gateway device 101 aggregates communication errors that have occurred in each short monitoring interval period ST (step S204).

Next, the gateway device 101 selects one of a plurality of CAN-IDs used in the on-vehicle network 12 (step S206).

Next, when a total ENp, in the long monitoring interval period LT, of the number of times of occurrence of protocol error corresponding to the selected CAN-ID, i.e., a target CAN-ID, is greater than the threshold Th3 and an intra-bus protocol error distribution EDp in the long monitoring interval period LT is smaller than the threshold Th4 (YES in step S208), the gateway device 101 detects a small number of attacks (step S218).

When the total ENp is greater than the threshold Th3 and the intra-bus protocol error distribution EDp is greater than the threshold Th6 (No in step S208 and YES in step S210), the gateway device 101 detects a large number of attacks (step S212).

Next, when having detected a small number of attacks (step S218) or having detected a large number of attacks (step S212), the gateway device 101 records a detection result in a log (step S214).

When the total ENp is not greater than the threshold Th3 or the intra-bus protocol error distribution EDp is not less than the threshold Th4 and not greater than the threshold Th6 (NO in step S208 and NO in step S210), or when the gateway device 101 has recorded a detection result in a log (step S214), the gateway device 101 confirms whether or not all of the plurality of CAN-IDs used in the on-vehicle network 12 have been selected (step S216).

When there is any unselected CAN-ID in the plurality of CAN-IDs (NO in step S216), the gateway device 101 selects one unselected CAN-ID in the plurality of CAN-IDs (S206).

Meanwhile, when having selected all of the plurality of CAN-IDs (YES in step S216), the gateway device 101 records communication errors that have occurred in a new long monitoring interval period LT, while performing a process of relaying data frames until the new long monitoring interval period LT is completed (NO in step S202).

The gateway device according to the embodiment of the present disclosure is configured to perform attack detection with respect to all of the buses 13A to 13D. However, the present disclosure is not limited thereto. The gateway device 101 may be configured to perform attack detection with respect to a part of the buses 13A to 13D.

In the on-vehicle network according to the embodiment of the present disclosure, the gateway device 101 is configured to detect an attack in the on-vehicle network 12. However, the present disclosure is not limited thereto. A configuration may be employed in which at least one of the on-vehicle ECUs 121 connected to buses 13 operates as a detection device, similar to the gateway device 101, and detects an attack in a corresponding bus 13.

In the on-vehicle network according to the embodiment of the present disclosure, a data frame that includes identification information that allows recognition of both the transmission source and the destination is transmitted. However, the present disclosure is not limited thereto. A data frame that includes identification information that allows recognition of either one of the transmission source and the destination may be transmitted.

In the on-vehicle network according to the embodiment of the present disclosure, a data frame that includes a CAN-ID that allows recognition of both the transmission source and the destination is transmitted. However, the present disclosure is not limited thereto. A data frame that includes identification information that directly indicates at least one of the transmission source and the destination, e.g., an address, may be transmitted.

In the gateway device according to the embodiment of the present disclosure, the detection unit 55 is configured to detect an attack in the on-vehicle network 12 on the basis of a bias in the communication error occurrence state among CAN-IDs in an aggregation result by the aggregation unit 54. However, the present disclosure is not limited thereto. The detection unit 55 may be configured to detect an attack in the on-vehicle network 12 not on the basis of the bias. Specifically, for example, the detection unit 55 detects an attack in the on-vehicle network 12 without using the summary table Tbl2 shown in FIG. 10.

In the gateway device according to the embodiment of the present disclosure, the detection unit 55 is configured to perform both the short interval detection process and the long interval detection process. However, the present disclosure is not limited thereto. The detection unit 55 may be configured to perform either one of the short interval detection process and the long interval detection process.

In the gateway device according to the embodiment of the present disclosure, the detection unit 55 is configured to detect an attack in the on-vehicle network 12 on the basis of the comparison result Rst1, the comparison result Rst2, and the comparison result Rst5. However, the present disclosure is not limited thereto. The detection unit 55 may be configured to detect an attack in the on-vehicle network 12 on the basis of the comparison result Rst1 and the comparison result Rst2.

In the gateway device according to the embodiment of the present disclosure, the detection unit 55 is configured to detect an attack in the on-vehicle network 12 on the basis of the comparison result Rst3, the comparison result Rst4, and the comparison result Rst6. However, the present disclosure is not limited thereto. The detection unit 55 may be configured to detect an attack in the on-vehicle network 12 on the basis of the comparison result Rst3 and the comparison result Rst4.

Meanwhile, in the on-vehicle communication system described in PATENT LITERATURE 1, a first encryption key to be used in message authentication by a first ECU and a second ECU which are connected only to an on-vehicle network is different from a second encryption key to be used by a third ECU connected to both the on-vehicle network and an external network, thereby preventing cyberattack from the external network on the first ECU and the second ECU which are not connected to the external network.

However, for example, under a cyberattack that electrically operates a signal transmitted in a bus which connects ECUs, the security measure described above could be invalidated.

In a case where such an attack has been made, a technology for accurately detecting the attack in an on-vehicle network is required.

In contrast, the gateway device according to the embodiment of the present disclosure detects an attack in the on-vehicle network 12 that includes a bus 13 in which a data frame including identification information that allows recognition of at least one of a transmission source and a destination is transmitted. In the bus 13, a plurality of data frames that include pieces of identification information different from each other are transmitted. The transmission/reception unit 51 monitors communication errors in the bus 13. The aggregation unit 54 aggregates the communication error occurrence state regarding each piece of identification information, on the basis of a monitoring result by the transmission/reception unit 51. Then, the detection unit 55 detects an attack in the on-vehicle network 12 on the basis of the aggregation result by the aggregation unit 54.

Due to this configuration, the communication error occurrence state regarding each on-vehicle device serving as a transmission source or a destination of the data frame can be recognized on the basis of an aggregation result of the communication error occurrence state regarding each piece of identification information. Accordingly, it is possible to specify an on-vehicle device in which a communication error has occurred under such a cyberattack that electrically operates a signal transmitted in a bus 13, for example. Therefore, an attack in an on-vehicle network can be accurately detected.

In the gateway device according to the embodiment of the present disclosure, the detection unit 55 detects an attack in the on-vehicle network 12 on the basis of a bias in the communication error occurrence state among pieces of identification information in an aggregation result.

Due to this configuration, on the basis of a bias in the communication error occurrence state among the pieces of identification information, it is possible to recognize whether communication errors have evenly occurred among the on-vehicle devices in the on-vehicle network 12, or whether communication errors have occurred in a small number of specific on-vehicle devices among the on-vehicle devices, for example. Accordingly, for example, when communication errors have evenly occurred among the on-vehicle devices, attack detection can be carefully determined also in consideration of influence of electric noise. In addition, when communication errors have occurred in a small number of specific on-vehicle devices, it is possible to determine there is a high possibility that attacks have been made.

In the gateway device according to the embodiment of the present disclosure, the detection unit 55 detects an attack in the on-vehicle network 12 on the basis of: the total, regarding each piece of identification information, of the number of times of occurrence of communication error; and an error ID number, which is the number of pieces of identification information for which communication errors have occurred.

Due to this configuration, for example, when it is to be determined that attacks have been made on on-vehicle devices that have a large number of times of occurrence of communication error, the number of on-vehicle devices in which communication errors have occurred can be taken into consideration. Thus, whether or not attacks have been made can be more accurately determined.

In the gateway device according to the embodiment of the present disclosure, the detection unit 55 detects an attack in the on-vehicle network 12 on the basis of at least one of: a comparison result Rst1 between the threshold Th1 and the total in a short monitoring interval period ST, and a comparison result Rst2 between the threshold Th2 and the error ID number; and a comparison result Rst3 between the threshold Th3 and the total in the long monitoring interval period LT composed of a plurality of short monitoring interval periods ST, and a comparison result Rst4 between the threshold Th4 and the average of the error ID number.

Due to this configuration, for example, even when the total in the short monitoring interval period ST is greater than the threshold Th1, if the error ID number is not less than the threshold Th2, it is conceivable that communication errors have widely occurred due to electric noise. Thus, an erroneous attack detection can be prevented. In addition, for example, when the total in the short monitoring interval period ST is greater than the threshold Th1 and the error ID number is smaller than the threshold Th2, communication errors have occurred in a small number of specific on-vehicle devices. Thus, attacks on the small number of specific on-vehicle devices can be more accurately detected. In addition, even when the total in the long monitoring interval period LT is greater than the threshold Th3, if the average of the error ID number is not less than the threshold Th4, it is conceivable that communication errors have widely occurred due to electric noise. Thus, an erroneous attack detection can be prevented. For example, when the total in the long monitoring interval period LT is greater than the threshold Th3 and the average of the error ID number is smaller than the threshold Th4, communication errors have occurred in a small number of specific on-vehicle devices. Thus, attacks on the small number of specific on-vehicle devices can be more accurately detected.

In the gateway device according to the embodiment of the present disclosure, the detection unit 55 detects an attack in the on-vehicle network 12 on the basis of at least one of: the comparison result Rst1, the comparison result Rst2, and the comparison result between the threshold Th5 greater than the threshold Th2 and the error ID number; and the comparison result Rst3, the comparison result Rst4, and the comparison result between the threshold Th6 greater than the threshold Th4 and the average of the error ID number.

For example, when at least one of the error ID number in a short monitoring interval period ST and the average of the error ID number in the long monitoring interval period LT is significantly large, it is considered that a large number of on-vehicle devices in the on-vehicle network 12 are being attacked. Due to the above-described configuration, a storm of attacks on the on-vehicle devices in the on-vehicle network 12 can be more accurately detected.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

A detection device configured to detect an attack in an on-vehicle network that includes a bus in which a frame including identification information that allows recognition of at least one of a transmission source and a destination is transmitted, a plurality of the frames being transmitted in the bus, the plurality of the frames including pieces of the identification information different from each other, the detection device comprising:

a monitoring unit configured to monitor a communication error in the bus;

an aggregation unit configured to aggregate a communication error occurrence state regarding each piece of the identification information on the basis of a monitoring result by the monitoring unit; and a detection unit configured to detect the attack on the basis of an aggregation result by the aggregation unit, wherein the detection device is mounted in a vehicle, and is a gateway device configured to relay the frame or an on-vehicle ECU (Electronic Control Unit), each piece of the identification information is a CAN-ID (Controller Area Network-Identifier), the on-vehicle network includes a TCU (Telematics Communication Unit), an automated driving ECU, an engine ECU, a sensor, a navigation device, a human machine interface, or a camera, which is mounted in the vehicle, the frame is transmitted in the on-vehicle network in accordance with a communication standard of CAN, FlexRay, MOST (Media Oriented Systems Transport), Ethernet, or LIN (Local Interconnect Network), and the aggregation unit aggregates the number of times of occurrence of protocol error regarding each CAN-ID.

REFERENCE SIGNS LIST 1 vehicle
12 on-vehicle network
13 bus
51 transmission/reception unit (monitoring unit)
52 relay unit
54 aggregation unit
55 detection unit
56 storage unit
101 gateway device
121 on-vehicle ECU
122 transceiver
123 attack device
301 on-vehicle communication system

The invention claimed is:

1. A detection method to be used in a detection device configured to detect an attack in an on-vehicle network that includes a bus in which a frame including identification information that allows recognition of at least one of a transmission source and a destination is transmitted, a plurality of the frames being transmitted in the bus, the plurality of the frames including pieces of the identification information different from each other, the detection method comprising the steps of:

monitoring a communication error in the bus, the communication error being an error of a bit string in a protocol error monitoring section defined in each frame;

aggregating communication error occurrence states regarding each piece of the identification information based on a monitoring result; and detecting the attack based on an aggregation result, wherein the aggregation result includes (i) a total, regarding each piece of the identification information, of the number of times of occurrence of the communication error; and (ii) an error ID number, which is the number of pieces of the identification information for which the communication error has occurred.

2. A non-transitory computer readable storage medium storing a detection program to be used in a detection device configured to detect an attack in an on-vehicle network that includes a bus in which a frame including identification information that allows recognition of at least one of a transmission source and a destination is transmitted, a plurality of the frames being transmitted in the bus, the plurality of the frames including pieces of the identification information different from each other, the detection program being configured to cause a computer to function as:

a monitoring unit configured to monitor a communication error in the bus, the communication error being an error of a bit string in a protocol error monitoring section defined in each frame;

an aggregation unit configured to aggregate communication error occurrence states regarding each piece of the identification information based on a monitoring result by the monitoring unit; and a detection unit configured to detect the attack based on an aggregation result by the aggregation unit, wherein the aggregation result includes (i) a total, regarding each piece of the identification information, of the number of times of occurrence of the communication error; and (ii) an error ID number, which is the number of pieces of the identification information for which the communication error has occurred.

3. A detection device configured to detect an attack in an on-vehicle network that includes a bus in which a frame including identification information that allows recognition of at least one of a transmission source and a destination is transmitted, a plurality of the frames being transmitted in the bus, the plurality of the frames including pieces of the identification information different from each other, the detection device comprising:

a monitoring unit configured to monitor a communication error in the bus, the communication error being an error of a bit string in a protocol error monitoring section defined in each frame;

an aggregation unit configured to aggregate communication error occurrence states regarding each piece of the identification information based on a monitoring result by the monitoring unit; and a detection unit configured to detect the attack based on an aggregation result by the aggregation unit, wherein the aggregation result includes (i) a total, regarding each piece of the identification information, of the number of times of occurrence of the communication error; and (ii) an error ID number, which is the number of pieces of the identification information for which the communication error has occurred.

4. The detection device according to claim 3, wherein the detection unit detects the attack based on a bias in the communication error occurrence state among the pieces of identification information in the aggregation result.

5. The detection device according to claim 1, wherein the detection unit detects the attack based on at least one of:

a first comparison result between a first threshold and the total in a first monitoring interval, and a second comparison result between a second threshold and the error ID number; and a third comparison result between a third threshold and the total in a second monitoring interval composed of a plurality of the first monitoring intervals, and a fourth comparison result between a fourth threshold and an average of the error ID number.

6. The detection device according to claim 5, wherein the detection unit detects the attack based on at least one of:

the first comparison result, the second comparison result, and a comparison result between a fifth threshold greater than the second threshold and the error ID number; and the third comparison result, the fourth comparison result, and a comparison result between a sixth threshold greater than the fourth threshold and the average.

* * * * *